Figure 1:
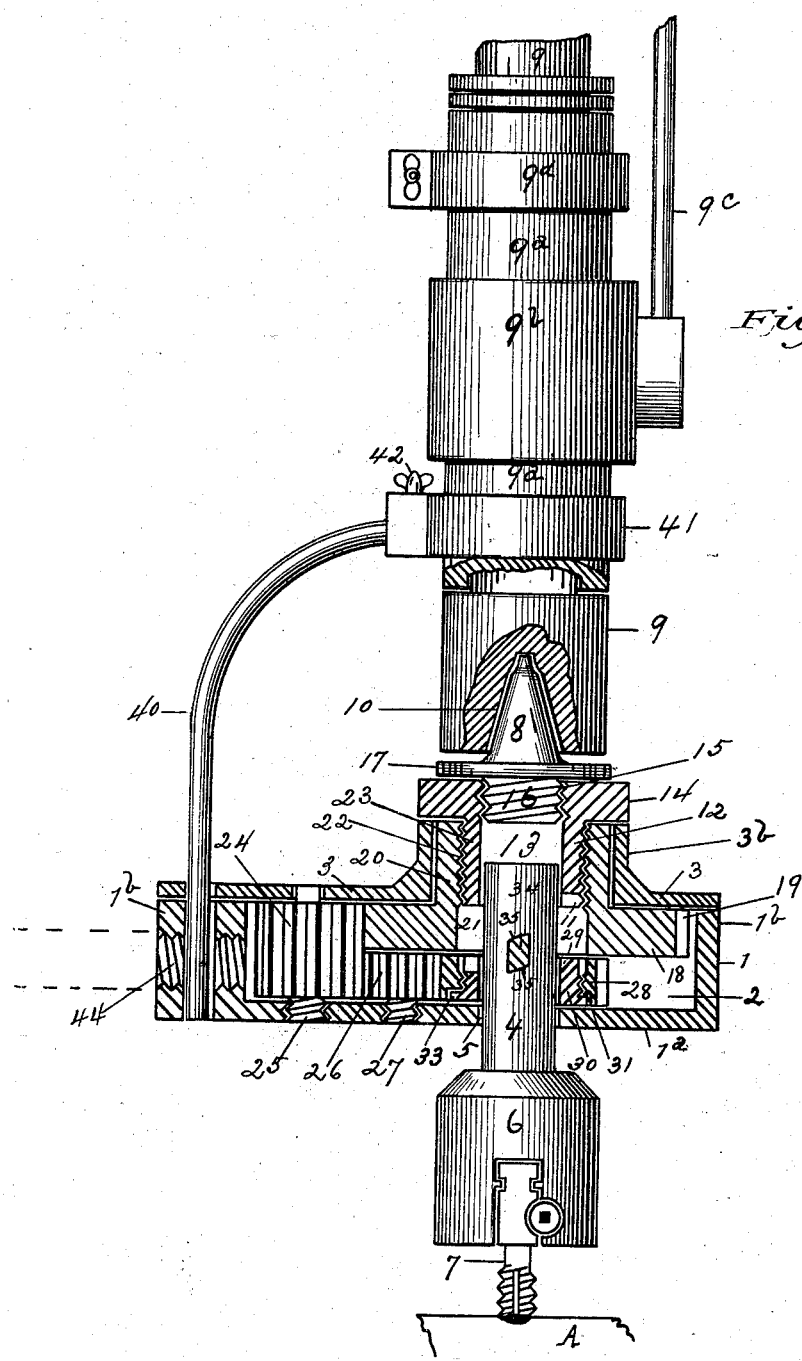

(No Model.)　　　　　　　　　　　　　　　　2 Sheets—Sheet 1.
F. A. ERRINGTON.
TAPPING ATTACHMENT.

No. 558,054.　　　　　　　　　　　Patented Apr. 14, 1896.

Witnesses　　　　　　　　　　　　　　　　Inventor.

(No Model.) 2 Sheets—Sheet 2.
F. A. ERRINGTON.
TAPPING ATTACHMENT.
No. 558,054. Patented Apr. 14, 1896.
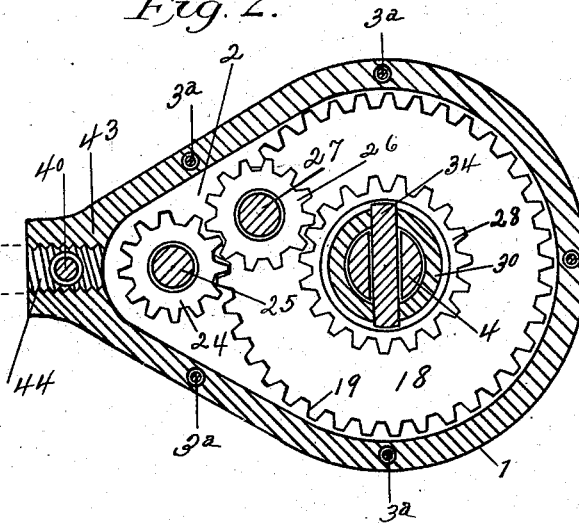
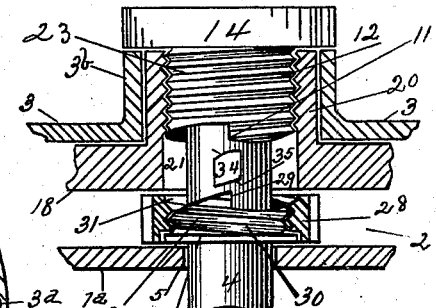
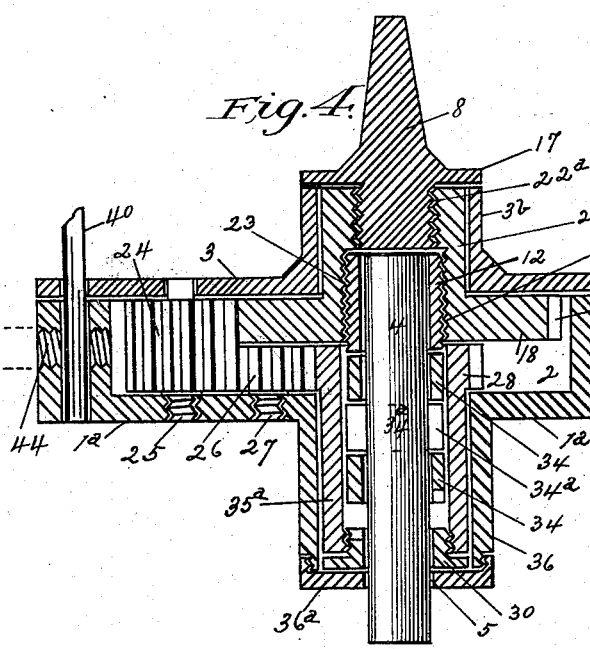
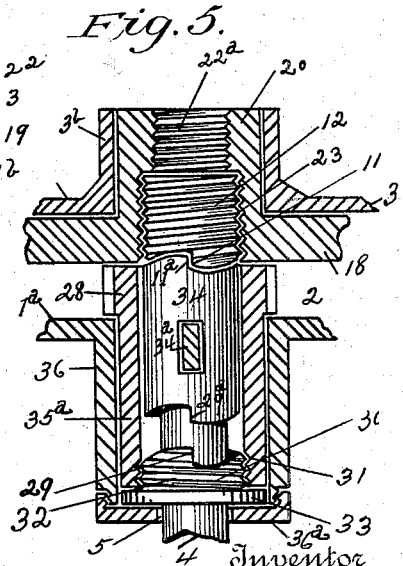
Witnesses
Alex Scott
Au Fong
Inventor
F. A. Errington

UNITED STATES PATENT OFFICE.

FRANKLIN A. ERRINGTON, OF EDGEWATER, NEW YORK.

TAPPING ATTACHMENT.

SPECIFICATION forming part of Letters Patent No. 558,054, dated April 14, 1896.

Application filed March 27, 1894. Serial No. 505,256. (No model.)

*To all whom it may concern:*

Be it known that I, FRANKLIN ALFRED ERRINGTON, a citizen of the United States, residing in the village of Edgewater, (P. O. Stapleton,) in the county of Richmond and State of New York, have invented certain new and useful Improvements in Tapping Attachments, of which the following is a specification.

My invention relates, broadly, to means for rotating a spindle in opposite directions, and more particularly to a self-contained device for tapping or threading, adapted for connection with the rotative spindle of a drill-press, lathe, or similar machine; and the invention consists in the novel details of improvement in reversing-clutch mechanisms for said purpose, as herein shown and described, whereby I materially simplify the construction of the parts, compacting the mechanism for the purpose of alining and supporting the spindle-bearings, and whereby I take up the shock and wear of the clutches by the introduction of a novel method of loosely centering in a transverse bore in the longitudinally-movable spindle an elastic spindle-clutch bar adapted for engagement alternately with either of the wheel-clutches to turn said spindle in one or the other direction.

Reference is to be had to the accompanying drawings, forming part hereof, wherein—

Figure 1 is a central cross-section of my improved tapping attachment connected with the longitudinally-movable spindle of a drill-press, showing the clutch mechanism located within the clutch-chamber 21, and the inner faces of the driving and reversing wheels bearing upon each other. Fig. 2 is an inverted plan view of the same, showing the coaction of the gear-train and the clutch-bar 34 loosely centered in the transverse spindle-bore. Fig. 3 is a detailed view of the clutch mechanism for driving the spindle in opposite directions, shown in full lines, the wheels and adjacent parts being shown in section. Fig. 4 is a central cross-section of a modified form, and Fig. 5 is a detail view showing the modified form of clutch in full lines.

In the accompanying drawings the numeral 1 indicates the casing of my improved tapping attachment, which consists, essentially, of a base-plate 1ª, having an upturned outer rim 1ᵇ, whereby a central hollow space 2 is formed. Said base-plate 1ª is provided with the spindle-bearing 5, and studs 25 and 27 are shown threaded into said base-plate and projecting upward into the space 2. The cover 3 is provided with a hub 3ᵇ, which is pierced by a bore or wheel bearing adapted to register with said spindle-bearing 5 when said cover 3 is in position upon said casing 1, and said cover 3 is also provided with a bore to support the top of the double-depth stud 25, and with screw-holes 3ª to receive the screws that fasten said cover to said casing.

The straight spur-gear reversing-pinion 26 is slipped over the reversing-stud 27, and the double-depth transmitting-pinion 24, which has been preferably shown in the form of a corrugated cylinder of twice the length (or height) of the reversing-pinion 26, is slipped over the stud 25, said studs being so located that the gear-teeth of said pinions mesh with each other, the stud 25 being located at a greater distance from the opening 5 than the stud 27 to bring the periphery of said double-depth pinion 24 farther from the center of said spindle-bearing 5 than that of the reversing-pinion 26. These pinions are preferably shown of the same diameter, to permit of their teeth being milled in long lengths, with the consequent saving in cost of manufacture, the pinions being then cut off to the lengths required for their respective duties.

The reversing gear-wheel 28 is shown provided with straight spur-gear teeth upon its periphery and pierced by a concentric screw-threaded bore 31. The clutch-sleeve 30 is shown provided with an annular flange or shoulder 33 and an externally-screw-threaded portion 32, and on its inner face are formed the clutch-teeth 29. Said clutch-sleeve is also pierced by a concentric bore. The length of the screw-threaded portion 32 from the shoulder 33 to the inner face of said clutch-sleeve is less than the depth of the screw-threaded bore 31, so that when said clutch-sleeve 30 is screwed into said bore 31 the shoulder 33 abuts against the outer face of said wheel 28 and limits the distance said screw-threaded portion 32 enters into said screw-threaded bore 31, whereby the inner face of said clutch-sleeve 30 is retained within the plane of the inner face of said wheel 28 to provide a clutch-chamber 21 between the inner face of said clutch-sleeve 30 and the plane of the inner face of said wheel 28. The wheel 28 and sleeve 30 being thus rigidly connected together, said wheel and said clutch-sleeve are placed in the casing 1 upon the base-plate 1ª, so that the bore of said clutch-sleeve 30 registers with the spindle-bearing 5 in said baseplate, when the gear-teeth of said wheel 28 will mesh with those of the reversing-pinion 26 and will avoid engagement with those of the double-depth transmitting-pinion 24, as said pinion is located farther from said spindle-bearing, as previously stated, for this purpose.

One end of the longitudinally-movable spindle 4 is shown rigidly attached to a tool holder or chuck 6, capable of holding a tool or tap 7; or said tool-holder may be integral with said spindle. At a certain distance above the chuck the spindle is shown pierced by a transverse bore, preferably provided with plane rectangular surfaces. The other end or the top of the spindle 4 is inserted up through the spindle-bearing 5 in the base-plate 1ª and through the bore in the sleeve 30 until said transverse spindle-bore appears above the inner face of the wheel 28, when the clutch-bar 34 is slipped loosely through said transverse spindle-bore, and projecting on both sides from the periphery of said spindle rests on the inner face of the sleeve 30 in the clutch-chamber 21 and prevents said spindle from slipping back through its bearings.

The driving gear-wheel 18 is provided with straight spur-gear teeth upon its periphery and with a hub 20 projecting from its outer face, and said wheel and its hub are also shown pierced with a concentric screw-threaded bore 22. The clutch-sleeve 12 is shown provided with an annular flange or shoulder 14 and an externally-screw-threaded portion 23, and on its inner face are formed the clutch-teeth 11. Said clutch-sleeve is pierced by a concentric bore 13, provided at its upper end with screw-threads 15 for connection with a rotative driving part, say, through the medium of the connecting-shank 8, whose screw-threaded portion 16 meshes with said screw-threads 15, the other end of said shank being tapered to fit the usual tapered socket in the longitudinally-movable drill-press spindle 9, which latter parts may be of usual or approved design as usually found in such machines; or said clutch-sleeve 12 may be otherwise connected or driven, some of which variations are illustrated in Figs. 4 and 5.

The length of the screw-threaded portion 23 of the clutch-sleeve 12 is less than the depth of the screw-threaded bore 22 in the driving-wheel 18, so that when the shoulder 14 bears upon the outer rim of the hub 20 it holds the inner face of the clutch-sleeve 12 within the plane of the inner face of the wheel 18 to provide a clutch-chamber 21 between the inner face of said clutch-sleeve 12 and the plane of the inner face of the wheel 18. Before screwing said clutch-sleeve 12 and said wheel 18 together, however, the hub 20 of said wheel is first inserted through the bore provided for that purpose in the hub 3ᵇ of the cover 3, so that when the clutch-sleeve 12 is screwed into position in said wheel 18 and the shoulder 14 abuts against the outer rim of said hub 20 the cover 3 is confined between said shoulder 14 and the outer face of the wheel 18 by a close-running fit. It is here seen that as the sleeve 12 and the wheel 18 are the only parts rigidly connected with the means of support the rigidity and alinement of the spindle-bearing 5 depend upon the support that the parts of the device receive by their bearing upon said directly-connected parts. I secure the maximum firmness in the cover-bearing and the most compact and mutually-supporting mechanism, first, by a novel reversing gear-train wherein the directly-connected gear-wheel 18, while embracing the unquestioned advantages of straight spur-gear teeth upon its periphery, is also the largest member of the gear-train, affording an ample bearing for the inner face of the cover 3 on its outer face, and, second, by recessing the wheel-clutches within the planes of the inner faces of one or both of the wheels the inner faces of the wheels are enabled to closely approach to bear upon each other, thus giving the dependent parts a bearing on both sides of the large directly-connected gear-wheel 18. When we now slip the bore 13 of the clutch-sleeve 12 over the upper end of the spindle 4, the gear-teeth of the wheel 18 mesh with those of the double-depth transmitting-pinion 24, the holes 3ª of the cover register with corresponding screw-threaded holes in the casing 1, and the device is fastened together by inserting screws therein and screwing them firmly into place. It is now seen that the clutch-bar 34 is located in and on all sides surrounded by the walls of the clutch-chamber 21. As previously stated, I preferably make said clutch-bar a loose fit in said transverse bore in the spindle 4. This construction would be impracticable but for the retaining-walls of the clutch-chamber 21, which prevent the escape of said clutch-bar from its proper position. The ability to thus use a loosely-fitted clutch-bar it is here seen is dependent upon the discovery of means for holding it in position without interfering with the object for which I desire to have said clutch-bar capable of free though slight transverse and lateral movement. (See Fig. 2.)

To appreciate the value and necessity for the invention of this construction, I need but refer to the acknowledged fact that the high speed of the rotative spindle of the class of machines to which this device is adapted to be attached, particularly in the smaller and more useful sizes, creates a violent shock or blow upon the engagement of the reversing-clutches with the spindle-clutch, (at which time the tap is firmly embedded in the work,)

resulting in the frequent breakage of small taps at this stage of the operation and in the breakage or excessive wear of the clutch mechanism, and that this has been a serious difficulty in constructing a device for tapping to operate within the range of speeds usually provided in such machines for their regular functions of drilling, &c. I have finally succeeded in overcoming this difficulty by the construction shown and above described, whereby the blow of the reversing-clutches is cushioned or taken up by the elasticity of the clutch-bar 34, which, being loosely centered, as aforesaid, is enabled to move transversely in bending through its whole length under the shock of the engagement of the clutches. This construction also facilitates the ready replacing of the clutch-bar 34 when worn out, and the slight lateral movement afforded by the loose fit is sufficient to insure the engagement of both ends of the clutch-bar simultaneously with the two clutch-teeth of either sleeve 12 or sleeve 30, thus evenly distributing the strain and permitting a clutch-bar of smaller cross-section being used.

My device is capable of handling even very small taps under the conditions usually existing in sensitive drill-presses for drills adapted for said taps. The height of the clutch-bar 34 is preferably shown, Fig. 3, less than the distance between the clutch-teeth 11 and 29, so that at certain times said clutch-bar may remain out of engagement with either of the driving-clutches. Said clutch-bar is also preferably shown rectangular in cross-section, affording right and left hand plane-surfaces to engage, and with opposite corners beveled at 35 to provide clearance for the teeth 11 and 29.

The operation of the device is as follows: The numeral 9 indicates the rotative spindle of a drill-press to be turned continuously in one direction, as usually arranged for drilling, said spindle being journaled in and connected to move longitudinally with a non-rotary longitudinally-movable sleeve $9^a$, which passes through the stationary frame $9^b$, which frame is shown provided with means, operated by the lever $9^c$, to raise and lower said sleeve $9^a$, all of which parts may be of approved design as usually found in such machines. The internal rotative members of my device being connected to rotate with the spindle 9 by the shank 8, and the casing 1 being held from rotating but left free to move longitudinally with the spindle 9 by being connected with the non-rotary sleeve $9^a$ by the rod 40, entering collar 41 and held thereto by the set-screw 42 or equivalent means, and assuming the spindle 9 to be turning right hand, the spindle 4 and its directly-connected parts will, when hanging idly, be rotated in the opposite direction to spindle 9, or left hand, for the clutch-bar 34 will be in engagement with the clutch-teeth 29, and, as previously described, the clutch-sleeve 12 and the driving-wheel 18 are directly connected to and turn with the drill-press spindle 9 and the wheel 18 meshes with the double-depth pinion 24, the driving-faces of whose teeth, being of greater length (or depth) than those of the gear-teeth of wheel 18, extend down into the lower tier of gearing and mesh with the gear-teeth of the pinion 26, which last-named pinion, it is seen, rotates in the same direction as the wheel 18, the motion having merely been transmitted, and it is in meshing with the wheel 28 that the pinion 26 reverses the motion and drives the wheel 28 and clutch-sleeve 30 in the opposite direction to wheel 18 and clutch-sleeve 12. Attention is here called to the direct and simple method of transmitting the motion to the reversing-pinion, it being radically different and superior to any means previously employed by others for this purpose, and that the advantages contingent upon the use of a double-depth transmitting-pinion can only be secured when the inside working-depth diameter of the gear-teeth of driving-wheel 18 is greater than the addendum or outside diameter of the gear-teeth of the reversing-wheel 28, to enable said pinion 24 to mesh with the reversing-pinion 26 and avoid engagement with the reversing-wheel 28, and that this arrangement is an important factor in securing the rigidity of the spindle-bearings.

The operator in lowering the lever $9^c$ presses the tap 7 against the edges of the hole shown in work A, and the spindle 4 being thus held from longitudinal movement the device descends along said spindle 4 until the clutch-teeth 11 engage the clutch-bar 34, when said spindle 4 is driven in the working direction (or right hand) by direct connection with the spindle 9 and the tap 7 enters the work A, the operator continuing to follow the longitudinal movement of the tap by feeding down the spindle 9 until the collar $9^d$, shown adjustably carried by the sleeve $9^a$, encounters the stationary frame $9^b$ of the drill-press, when the further longitudinal movement of the casing 1 is thereby arrested. The spiral action of the teeth of the tap 7 continues the longitudinal movement of the tap 7, under the continued rotation of the spindle 9, until the clutch-bar 34 is thus moved or drawn out of engagement with the clutch-teeth 11 of the clutch-sleeve 12, when the spindle 4 and its connected parts cease to rotate, although the spindle 9 continues to turn without interruption. This arrangement is particularly designed to stop the rotation of the tap at a predetermined depth, as in the case of holes that do not run entirely through the metal. To remove the tap 7 from the hole, the operator now raises the lever $9^c$, and with it the casing 1 until the clutch-bar 34 engages the reversing clutch-teeth 29 of the clutch-sleeve 30, which, being always rotating in the opposite direction to the teeth 11, as above explained, back the tap 7 out of the hole in the work A by turning the spindle 4 indirectly in the opposite direction to the spindle 9. As the tap rises from the hole the operator continues to raise the casing 1 to keep the clutch-bar 34 in engagement with the clutch-teeth 29, as should he stop raising the device before the tap left the hole the clutch-bar 34 would be raised out of engagement with the clutch-teeth 29 by the spiral action of the teeth of the tap 7, the same as previously explained when the tap was descending and drew the clutch-bar 34 out of engagement with the clutch-teeth 11.

In Figs. 4 and 5 I have shown the part 34 arranged to conveniently distribute the strain when a small spindle 4 is used, as well as to provide a longer bearing for said spindle. In this case the part 34 is shown in the form of a clutch-sleeve secured on the spindle 4 by a pin $34^a$ or other means, and having teeth $11^a$ and $29^a$ to engage teeth 11 and 29. In order to allow for the length of the sleeve 34, I have increased the length of the clutch-chamber between the inner faces of the clutch-sleeves 12 and 30 by providing the wheel 28 with an extension or hub $35^a$. While the use of the sleeve 34 is open to the objections overcome by me in devising the elastic clutch-bar construction above described, it is here shown for the purpose of illustrating the great advantages derived by the locating of the clutch-chamber 21 within the planes of the inner faces of the wheels. With any other construction than that devised by me the accommodation of the intermediate spindle clutch-sleeve 34 in the device shown would involve making the whole device at least three times larger and heavier by extending the space 2, making two transmitting-pinions 24 and more or less complicated means for holding wheel 28 in position, whereas I merely extend the clutch-chamber 21 by the addition of the hub $35^a$ to the wheel 28, which hub, being of small diameter, does not materially increase the weight of the device, while the size and position of the members of the gear-train are not affected and the wheel 28 is held firmly in position by bearing upon the inner face of the wheel 18. The rotative members of the device are thus held in their operative positions by their form and size only, which is particularly valuable in the case of the wheel 28, which would otherwise have to be externally fastened to the base-plate $1^a$ to prevent its rising upon attempting to disengage the reversing-clutches from the spindle-clutch. Instead of merely enlarging the opening 5 in the base-plate $1^a$ to provide for the hub $35^a$, I preferably add the tubular extension 36 to said base-plate, which may have a screw-threaded cap $36^a$ at its bottom, that is provided with the opening 5, giving the spindle 4 a long and firm bearing. It is thus seen that any other construction than that invented by me increases the leverage and instability of the spindle-bearings and the weight of the device in proportion as the size of the device is increased, while my construction is primarily self-supporting, and the firmness of the spindle-bearings is increased proportionately to any increase in the length of the device without a proportionate increase in weight.

As my device may also be attached to the rotative but not longitudinally-movable spindle of a lathe I have provided one side $1^b$ of the casing 1 with an enlarged part 43, having a threaded aperture 44, in which a suitable rod may be screwed to prevent the rotation of the casing 1, said rod resting on the V's or any other desired non-rotary part of the lathe. In this case the work would be moved longitudinally to and from the tap 7 to drive the spindle in the working or the reverse direction, respectively.

The bulk and slow speed of all previous devices have heretofore limited them to use in a horizontal position, where the immovable case can be rigidly supported and the clutch mechanism run slowly to permit of the use of small taps. For large tapping the old forms of construction have been used on a drill-press in a few instances; but their excessive clumsiness and instability have prohibited their general use, even for large work, while they have been entirely debarred from the sensitive work of small tapping, which I have found to be the largest field for a device of my construction, embodying in a longitudinally-movable casing a firm bearing and accurate alinement to the spindle with a compact and sensitive mechanism secured by the radical departures I have above shown and described.

Having now described my invention, what I claim is—

1. The combination of two gear-wheels journaled in a non-rotative part carrying gearing adapted to secure the simultaneous rotation of said wheels in opposite directions, one of said wheels having a clutch-chamber 21, within the plane of its inner face, a positive clutch located in said clutch-chamber and connected to rotate with said wheel, the face of said clutch also lying within the plane of the inner face of said wheel, whereby the inner faces of said wheels can bear upon each other, another clutch connected to rotate with the other of said wheels, a longitudinally-movable spindle having a transverse bore, a transversely and laterally movable clutch-bar located in said transverse bore in said spindle, and extending beyond the periphery thereof into said clutch-chamber between said wheel-clutches, the walls of said clutch-chamber serving to retain said clutch-bar in position in said transverse spindle-bore, substantially as described.

2. The combination of a gear-wheel having a clutch-chamber 21 within the plane of its inner face, a positive clutch located in said clutch-chamber and connected to rotate with said wheel, the face of said clutch also lying within the plane of the inner face of said wheel, a longitudinally-movable spindle, a clutch connected therewith, another gear-wheel provided with a clutch, and a non-rotative part carrying gearing adapted to secure the simultaneous rotation of wheels in opposite directions, substantially as described.

3. The combination of a driving-wheel, and a reversing-wheel, each of said wheels having gear-teeth upon its periphery, the driving-faces of said gear-teeth being parallel with the axes of said wheels, said axes being concentric, one of said wheels having a clutch-chamber 21, in its inner face, a positive clutch located in said clutch-chamber and connected to rotate with said wheel, the face of said clutch lying within the plane of the inner face of said wheel, another clutch connected with the other of said wheels, a spindle, and an intermediate clutch connected to rotate with said spindle and located in said clutch-chamber between said wheel-clutches, and a non-rotative part carrying a reversing-pinion, that meshes with said reversing-wheel, and a double-depth transmitting-pinion, that meshes with said driving-wheel, and with said reversing-pinion, substantially as described.

4. The combination of a wheel, a clutch connected therewith, a spindle carrying a clutch for engagement with said wheel-clutch, another wheel having a concentric screw-threaded bore, a clutch-sleeve provided with a concentric bore for the reception of said spindle, and having a shoulder, and an externally-screw-threaded portion carrying on its inner face a positive clutch, said screw-threaded portion of said clutch-sleeve being adapted to mesh with said screw-threaded bore in said wheel, and said shoulder of said clutch-sleeve being arranged to bear upon said wheel to limit the distance that said screw-threaded portion of said clutch-sleeve shall enter said screw-threaded bore of said wheel, the depth of said screw-threaded bore of said wheel being greater than the length of that portion of said clutch-sleeve which extends from said shoulder of said clutch-sleeve to the inner face of said clutch-sleeve upon which said positive clutch is located, to provide a clutch-chamber 21, between the inner face of said clutch-sleeve and the plane of the inner face of said wheel, and a non-rotative part carrying gearing adapted to secure the simultaneous rotation of said wheels in opposite directions, substantially as described.

5. The combination of a driving-wheel 18, and a reversing-wheel 28, each of said wheels having gear-teeth upon its periphery, the driving-faces of said gear-teeth being parallel with the axes of said wheels, said axes being concentric, each of said wheels, being provided with a clutch, a longitudinally-movable spindle, a clutch connected therewith and located between said wheel-clutches, a non-rotative casing 1, having a cover 3, a base-plate 1ª, and studs 25, and 27, a reversing-pinion 26, journaled on said stud 27, resting upon said base-plate 1ª, and meshing with said reversing-wheel 28, and a double-depth transmitting-pinion 24, similarly journaled on stud 25, and having gear-teeth upon its periphery whose driving-faces are of greater depth (or width) than those of the gear-teeth of the driving-wheel 18, the inside working-depth diameter of said driving-wheel 18, being greater than the addendum (or outside) diameter of the reversing-wheel 28, to enable said double-depth transmitting-pinion 24, to mesh with said driving-wheel 18, and with the reversing-pinion 26, and to avoid engagement with the reversing-wheel 28, whereby the maximum bearing-surface for the inner face of said cover 3, upon the outer face of said gear-wheel 18, is secured, substantially as described.

6. The combination of two wheels journaled in a non-rotative casing having a non-rotative spindle-bearing in its base-plate and carrying gearing adapted to secure the simultaneous rotation of said wheels in opposite directions, one of said wheels having a clutch-chamber within the plane of its inner face, a positive clutch located in said clutch-chamber and connected to rotate with said wheel, the face of said clutch also lying within the plane of the inner face of said wheel, another clutch connected with the other of said wheels, and a longitudinally-movable spindle provided with an intermediate clutch and having a direct bearing in said non-rotative spindle-bearing in said base plate of said casing, substantially as described.

F. A. ERRINGTON.

Witnesses:
H. J. WHEATON,
T. F. BOURNE.